United States Patent [19]

Stebbins et al.

[11] 4,030,210

[45] June 21, 1977

[54] METHOD OF AND MEANS FOR DEMONSTRATING EVOLUTION INCLUDING CHANCE DETERMINATIONS

[76] Inventors: Robert C. Stebbins, 601 Plateau Drive, Kensington, Calif. 94708; Brockenbrough S. Allen, 1320 Juanita Drive, Walnut Creek, Calif. 94595; Charles W. Brown, Santa Rosa Junior College, Santa Rosa, Calif. 95402

[22] Filed: Feb. 25, 1974

[21] Appl. No.: 445,593

Related U.S. Application Data

[62] Division of Ser. No. 202,496, Nov. 26, 1971.

[52] U.S. Cl. .......................... 35/20; 273/135 AA; 273/135 AC; 273/146
[51] Int. Cl.² ...................................... G09B 23/36
[58] Field of Search ................... 35/8 R, 19 R, 20; 273/131 B, 134 AD, 134 D, 135 AA, 146

[56] References Cited

UNITED STATES PATENTS

| | | | |
|---|---|---|---|
| 672,478 | 4/1901 | Gedney | 273/146 UX |
| 1,526,803 | 2/1925 | Miller | 273/146 |
| 1,587,580 | 6/1926 | Dutton | 273/146 |
| 1,787,521 | 1/1931 | Harrington | 273/134 AD X |
| 3,173,217 | 3/1965 | Schultz | 35/8 R |
| 3,532,342 | 10/1970 | Simpson | 273/131 B |
| 3,597,860 | 8/1971 | Capecelatro | 35/19 R |

OTHER PUBLICATIONS

David J. Kuhn, "A Simulation Game on Natural Selection", Jan. 1969, The Science Teacher, p. 68.
Martin Gardner, "Mathematical Games," Oct. 1970, Scientific American, pp. 120–123.

*Primary Examiner*—Harland S. Skogquist
*Attorney, Agent, or Firm*—James P. Hume; Jerold A. Jacover

[57] ABSTRACT

A method of and means for demonstrating organic evolution, particularly as it involves the mechanism of natural selection. Background panels of multicolor and intricate design or pattern are used to provide simulated natural environments, and thin chips of different colors and shades — and, in some instances, of different sizes and shapes — are used to provide simulated animals or plants to be placed on the background panels. A population of a predetermined number of chips of a predetermined mixture of colors — say, for instance, an equal number of from ten to twenty different colors — is selected. The chips constituting the selected population are then spread in a single layer more or less uniformly on the surface of the background panel, and preferably in spaced relation, so that each chip is in plain view and is more or less detectible — depending upon the color contrast existing between each chip, respectively, and the associated area of the background panel. Humans, for whom the demonstration is to be conducted, act as predators and remove from the panels a predetermined portion of the chips — say, for instance, seventy-five percent of the total population placed on the panel. The surviving chips are then counted and noted for color, and each is reproduced in equal amount so as, for instance, to restore the original population. Reproduction is carried out by mating surviving chips and providing additional chips as simulated offspring, as are dictated by genetic demands, indicated on specially formed chips and the use of a chance device such as a specially constructed die or the like. Various aspects of natural selection may be demonstrated by this invention, including reproduction by monohybrid crosses, dihybrid crosses, and trihybrid crosses. The removal of chips as by predators, followed by reproduction for restoring the population, may be repeated any desired number of times.

5 Claims, 6 Drawing Figures

METHOD OF AND MEANS FOR DEMONSTRATING EVOLUTION INCLUDING CHANCE DETERMINATIONS

CROSS-REFERENCE TO RELATED APPLICATION

This application is a division of an application by Robert C. Stebbins, Brockenbrough S. Allen, and Charles W. Brown, entitled METHOD OF AND MEANS FOR DEMONSTRATING EVOLUTION, Ser. No. 202,496, filed on Nov. 26, 1971.

BACKGROUND OF THE INVENTION

The concept of organic evolution is central to an understanding of modern biology and is essential to the work of the biologist. Natural selection appears to be the chief mechanism of evolutionary change. It is generally regarded by biologists as the process that has brought into being the myriad life forms that populate our planet, and that gave rise to man himself. Thus, it would be highly advantageous for all to understand the concept of natural selection. Unfortunately, traditional methods of biology teaching and resistance to the teaching of evolution, which persists even today, have inhibited understanding of this simple, but important, biological phenomenon first articulated by Charles Darwin in his Origin of Species over one hundred years ago.

In the present world context, with exploding human populations and environmental deterioration, it is important that large numbers of people come to see the world in evolutionary perspective. We must see ourselves as part of a changing and complex living fabric, the laws of which are neither for nor against us, but by which we must live if civilization is to endure. Our anthropocentrism must give way to a more inclusive view of nature.

The factors involved in natural selection have been summarized by Huxley (1966) as follows: (1) All organisms show considerable variation; (2) much of this variation is inherited; (3) in domesticated animals and plants, man is able to take advantage of inherited variation and produce new and useful types by artificial selection; (4) in nature, all organisms produce more offspring than can survive; (5) accordingly, not all the offspring will be able to survive or to reproduce; (6) some variants have a better chance of surviving or reproducing than others; (7) the result of this is natural selection—the differential survival or reproduction of favored variants; and this, given sufficient time, can gradually transform species and can produce both detailed adaptation in single species, and the large-scale, long-term improvement of types.

Accordingly, it is an object of this invention to provide certain novel simulations of the mechanism of natural selection and a number of evolutionary phenomena as a demonstrating procedure serving as an aid in the understanding of this subject.

It is also an object of this invention to provide novel means for carrying out the demonstrations of this invention.

Figure 1:
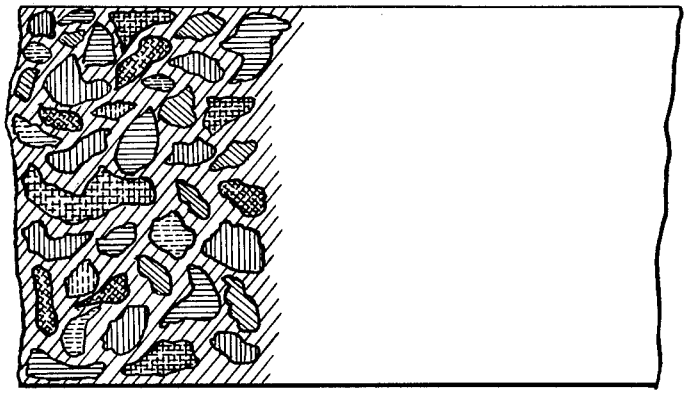
FIG. 1 is a plane view of a fragment of a background panel of the type suitable for carrying out demonstrations as contemplated for this invention. The pattern shown as to color and design is merely illustrative of many possible different designs and color schemes that may be employed.

In order to carry out a demonstration in accordance with this invention, certain materials are required. These include one or more background panels, as represented in FIG. 1 of the drawings, which may be of any suitable shape and size such, for instance, as a rectangle of approximately three feet by five feet. These panels may be made of any suitable material and are to be adapted to present a flat, horizontal surface on which chips or the like—of a type illustrated in FIG. 2 of the drawings and hereinafter more fully described—are to be distributed. The background panel should present a multicolored appearance of intricate design or pattern, and it may present its different colored areas of different shapes. These panels can be made of paper provided with the required printed designs, or of plastic having the multicolored appearance characteristics above-described. However, suitable background panels may be obtained by selecting yard goods of intricate, multicolored design.

Whenever relatively flexible materials are used, such as paper or cloth, a rigidifying backing may be applied in order to impart to the panel a smooth surface and the ability to be handled and readily supported in a horizontal position. It is also desirable to have a number of panels in order that the demonstration may be extended to simulate a plurality of different environmental conditions. For instance, the demonstration will show that natural selection involves the element of protection provided by the environment—that is to say the inability of the predator to readily see and find those particular chips whose color closely corresponds to the color of the associated background area. Hence, a background having a predominant overall visual effect of a particular color will promote the survivorship of chips having the same or a similar color.

Thus, comparative demonstrations may be made starting with the same identifying chips, both as to color and number of each color, placed on two or more different backgrounds. For instance, if a background should be predominantly brownish, then the brownish chips will be shown to be the survivors when illustrating the process of natural selection, whereas if the background should be predominantly green, then the green or greenish chips will in large measure be the survivors. Although the underlying principles of natural selection may be demonstrated with a single background panel, a plurality of different panels will permit a more extensive demonstration which, in turn, will illustrate the effect of environment on the process of natural selection. In addition, a panel or panels of solid white may be provided to represent an environment in nature covered with snow or an area of white sand such as found on a desert or a beach area.

Figure 2:
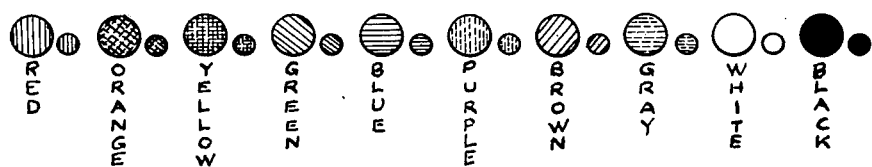
FIG. 2 is a plane view of a plurality of chips of the type suitable for practicing this invention. Ten different colors and two sizes of each color are represented.

When conducting a demonstration in accordance with this invention, the chips such as illustrated in FIG. 2 of the drawings will be used to represent animals or plants which are to be the subject of the particular demonstration being conducted. The different colors and other distinguishing markings on the chips will represent different species or particular animals or plants having specific characteristics.

The chips referred to may be made of any suitable material and may have any desired shape. However, they should be relatively thin and capable of being distributed in a single layer in spaced relationship over the surface of the background panels, and should be relatively unnoticeable when so disposed except for the color contrast they present. The chips may be made of colored paper, cardboard, or sheet-plastic material, and should be supplied in large quantities in a number of different colors—including different shades of the same color. Ten to twenty colors, including black, brown, and white, will be found to serve well. The chips should be capable of lying flat on the background and present a detectible appearance by virtue of the visual contrast they present in relation to the associated background appearance. Satisfactory chips may be inexpensively produced by punching from sheets of paper or other sheet stock. When five-feet by three-feet panels are employed, chips of one-quarter inch diameter will serve well. Also, the chips may have different shapes such, for instance, as triangular, square, or semicircular. In addition, certain chips may be marked with cross-hatching or other markings for providing appearance variations, as may be desired, to test the effect that such appearance differences may have when associated with a particular environment or background panel.

Figure 3:
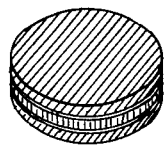
FIG. 3 is a perspective view of a different form of chip to be employed. Here multiple layers, in this case three, are employed. The center layer may be of a color differing from that of the two outside layers or it may be the same color. This figure is merely illustrative of other constructions having three or more layers and, in certain instances, more than two colors—all of which may represent simulated animals or plants having predetermined genetic characteristics according to a predetermined code, as indicated by the colors employed.

Furthermore, certain chips may be made up of laminations of paper or similar material such as illustrated in FIG. 3 of the drawings—showing at the edges thereof different or the same colors for the different laminations. In this way, particular genetic characteristics of the specimen, represented by the chip, may be indicated. These genetic characteristics are utilized in conducting the demonstration indicating the manner and results of the multiplication step or steps when the demonstration is being carried out.

Illustrative Specific Examples of this Invention

When conducting a demonstration in accordance with this invention, a predetermined population of chips—representing animals or plants—greatly varied in color is distributed throughout an imitation habitat or, in other words, are spread out on the surface of a selected background panel or panels having a predetermined design and appearance. The chips should be distributed in spaced relation in a single layer so that each chip is within the direct vision of the individuals for whom the demonstration is being conducted.

Thereafter, the persons participating in the demonstration are instructed to act as predators—and, in effect, they prey upon the population—and remove from the surface of the panel a predetermined portion of the population, say, for instance seventy-five percent of the chips. Thereafter, the surviving chips—in this instance twenty-five percent of the original population—are collected and noted as to color and shapes and are then reproduced by adding to them a predetermined number of chips similar to the surviving chips. In other words, for each chip remaining on the panel a predetermined number—say three—of the same color will be added. When three of each are added, the population is restored to its original size. The process of predation and reproduction can then be repeated, once, twice, or more times, after which the survivors will be found to be those that blend with their surroundings. In other words, the surviving population will be found to have adapted to the color of its background. With the chip so multiplied, asexual reproduction is simulated.

It should be pointed out that asexual reproduction no doubt preceded sexual reproduction in the evolution of life on earth, and that many organisms living today still reproduce in this way. There are examples on earth today of asexual reproduction, even among the higher vertebrates. Reference is made to a number of species of lizards, for example, which are all female.

The background material may be commercially produced cloth, such, for instance, as that sold as yard goods. In selecting yard goods for this purpose, it is preferred that patterns that simulate natural environments be chosen, such as floral, leaf, or fruit prints of rather intricate design containing some more or less circular elements or patterns approximating the size of the chips being employed. A demonstration can be made employing yard goods such as a white sheet, simulating snow, an alkali flat, or a desert.

To represent animals or plants, as the case may be, 500 chips of ten different colors may be used. By way of illustration, basic colors—red, orange, yellow, green, blue, violet, gray, black, brown, and white—may be selected. Each colored group of chips may be placed in a clear plastic vial or other container.

Select patterned material such as yard goods suggestive of a natural background for the background panel. The background panel may measure approximately three-feet by five-feet. When selecting the background material, it will be helpful to test a set of the colored chips against the pattern to make sure that at least some of the chips blend. It will probably be found that material with a rather intricate pattern will be more suitable than that with an open, rather plain design. Use several designs, each with a different color tone. It will then be possible to demonstrate the evolution of different adaptive types from the same starting population. Groups of students can conduct demonstrations simultaneously, and the surviving populations can be compared.

The participants should select ten chips of ten different colors to create a population of 100 animals. After being thoroughly mixed, the chips should be spread out on the background panel representing the habitat, while in horizonal position. Subdue the light in the room if the chips appear to be overly conspicuous. This is especially important with a simple background, such as a solid white or snow background. Achieve a roughly uniform distribution of the chips on the background surface. The participants then should space the chips out at about three to four-inch intervals to avoid clumping. A random and equidistant spacing is preferred.

At this point, the participants should shift positions and stand with their backs turned toward the habitat. This will help assure that they do not determine the location of the chips in advance. At a signal, the participants will face the panel and pick up the chips one at a time. As each chip is picked up, the predator should turn away, thus removing eye contact with the background, and place it in a suitable container. Chips may be taken from any part of the background. Predators are not to "feel" for chips by sliding their hands over the habitat. They are to be detected by sight only. A white box or pan may be used to collect the chips so that they can be readily seen and the number of captures easily determined.

Each predator will capture an assigned number of animals to insure removal of, say, seventy-five percent. The survivors are then removed from the panel and grouped according to color type. If more than twenty-five remain, redistribute the survivors on the habitat and remove the excess number in the manner described earlier. If there are less than twenty-five, make up the difference by random selection from among those chips captured. If it is not felt essential to maintain a constant population size, minor variations in numbers of survivors can be accepted and the survivor count need not be corrected. An error in this count of five to ten percent of the total population is within acceptable limits. Losses can be explained as deaths caused by disease or other factors unrelated to concealment. This will permit the demonstrator to introduce the idea of a variety of mortality factors operating in concert.

Keeping track of the number of offspring will be facilitated if the survivors are arranged in a horizontal row, spaced about one-half inch apart. For the purpose of reproducing the survivors, three offspring may be placed in a vertical column below each parent. Chips for this purpose may be obtained from the reserve supply of chips.

Set aside in a container, marked with the generation number, a complete set of survivors to be used in preparing a record of the demonstration. A sample representing the starting population should also be preserved. When all survivors have been reproduced, mix the chips thoroughly and distribute them as before on the habitat background.

An accurate and colorful record of the population changes that occur during the game may be obtained by attaching representative color chips to graph paper, as by using transparent adhesive tape. Representatives of the starting population can be placed in order of spectral colors (red to violet) in a horizontal row, and all survivors can be placed in vertical columns above its parent.

A graph will permit one readily to see the changes in percentages of the colors. At a glance, one can determine which colors have been eliminated and the percentages of survivors. A small patch of cloth removed from one corner of the background panel, when attached to the graph, provides a record of the habitat on which selection took place. Data concerning the experiment—number of participants, date, lighting conditions, size of the background, etc.—should also be included.

Simultaneous Selection For Two Characteristics

In natural populations, selection acts on a complex of characteristics—although at any given time and place one or a few traits may be most important. To make the selection model more realistic, traits in addition to color may be introduced. These can be pattern, size, or shape. FIG. 2 illustrates ten color varieties of chips in two sizes.

Patterned chips can be prepared by providing markings, such as lines or dots, on one or both sides of the colored chips. Half the chips of each color may be patterned, the remainder left plain, and relative survival rates can be compared. In producing chips with a lined pattern, lines one-eighth inch apart will be satisfactory. Black paper should not be used because of its unsuitability in showing pattern.

Selection For A Precise Color Match To Background

Field observers are often impressed with the precision with which some camouflaged animals match colors present in their habitat. By conducting a demonstration which includes several shades of each of several colors—green, brown, or yellow, for example, on a background containing one or more such colors—an opportunity is afforded for the evolution of a precise color match.

An experiment conducted on a white sheet, simulating snow or a pale desert habitat, may be of interest here. In this case, care should be taken to include in the chip population pale yellow and several shades of white, and make certain offspring of survivors are the proper shade.

Adaptive Radiation

One can simulate how, from the same basic evolutionary stock, different adaptive types may rise in different environments. There are many examples of adaptive radiation among organisms. A notable example is the radiation of adaptive types among Australian marsupials. These animals presumably evolved from a common ancestor that reached the continent in the distant past before the arrival of the more advanced (placental) mammals. Radiations have also occurred on a much more modest scale. Darwin's finches of the Galapagos Islands are a famous example.

Use three or more different fabrics and start a population of identical composition on each. Compare populations derived in each of these habitats after the second or third generations. Include a white sheet as one of the habitats. Adaptation to simple and complex environments can then be compared.

Convergent Evolution

Assume that round and half-round chips are two animal species that have been derived from different evolutionary lines. The two chip shapes can be thought of as species from different families, or perhaps even different orders. These species are regarded as completely isolated geographically, but they live in similar environments. Despite the basic morphological differences between them, they develop certain characteristics in common because the selective forces where they live are similar. Living examples are the mountain devil of Australia (a member of the lizard family Agamidae) and the desert horned lizard of western United States (a member of the family Iguanidae). Both live in arid regions and feed on ants. Both have developed spines and similar concealing coloration. There are many other examples.

Make up a starting population of each type of chip composed of an identical range in color. Initiate two selection demonstrations on separate but identical fabrics which represent the two isolated geographic regions in which similar ecological conditions prevail. Colors will converge after two or three generations, but shape will remain unchanged. The species thus retain their basic phylogenetic differences while undergoing convergent modification in color.

The Founder Principle

The particular course of evolution followed by a population is influenced by the hereditary composition of the original founding group. This principle can be illustrated by the rare accidental transport of a few members of a species from a mainland region to a remote island where the colonists established themselves, increase in number, and maintain a stable population. In a species that has a highly variable heredity, evolutionary directions that can be taken in the new environment may differ greatly depending upon the genetics of the individuals that happened to reach the new frontier. Since the arrival of new colonists is a rare event, the original ones will largely determine the heredity upon which natural selection will work.

To demonstrate this principle, prepare a container with a large assortment of chips, perhaps 50, differing in color, size, and shape. The container represents the ancestral habitat occupied by a highly variable species. Remove ten chips at random, without looking at them. These will be the colonists. Return to the ancestral population an identical set of chips to take their place so that later sampling will not be affected by the loss. Distribute the founding individuals on a background panel representing the new environment, such as a distant oceanic island. Each chip produces nine of its kind in the new habitat, bringing the population to one hundred. Go through three generations of selection, keeping a record of population changes as in previous examples. Take a second random sample from the mainland habitat and repeat the entire process. Compare the third generation obtained in each of these experiments. Differences resulting from the accident of initial sampling should be evident.

Balance Polymorphism

In some species, variation is such that the individuals at a given locality sort out into two or more rather distinct types of "morphs" which may differ in color and/or form. In stable environments, the proportions of the several morphs may remain relatively constant and a condition of balanced polymorphism exists. However, under changing conditions, the proportions of morphs may vary. This may happen, for example, in grass-dwelling species that experience seasonal changes in the color of grass. Balanced polymorphism implies selctive forces that favor the survival, at a more or less constant rate, of two or more variants over all others, including those of intermediate type.

The phenomenon can be illustrated by using a habitat background panel of two or more strongly contrasting colors, such as a fabric with a pattern approaching a checkerboard. Avoid complicated patterns with subtle shading.

Simulating Mutations

In natural populations, mutations are accidental hereditary changes that occur without reference to the adaptive "needs" of the organism. Often they are deleterious with respect to survival. Occasionally, however, they are advantageous. They are of utmost importance in providing new kinds of variability upon which natural selection can work and which will aid the species in adjusting to changing conditions. A mutation that may be deleterious under one set of environmental conditions may be advantageous under another. Whether a mutant is regarded as superior or inferior thus depends upon the conditions under which it occurs.

Evolve several well adapted populations on different backgrounds using the same starting population. Each population should be carried through the third generation. To introduce mutants, select at random (to simulate their accidental nature) five chips from a reserve supply of 25 or more assorted chips differing in color, size or shape from any of those used in the starting population. Increase each of these mutants to five, making a set of 25. Each of the recently evolved populations is to receive an identical set of these mutants. They may be substituted for the third offspring of each parent. Have the third generation parents in each population reproduce two offspring like themselves. Then add the set of mutants to bring the population to 100.

Save a set of the five mutants as a record of the kinds introduced. If the mutants of a given type are too few, they may be lost by accident in the process of selection, a lesson in itself, even though they may blend well with the background. One may wish to double the number of mutants, making ten rather than five of each. Proceed with selections through at least two generations in each of the populations. Record what happens to the mutants. Repeat the entire procedure on a new background for each population. Record results. Were the mutants more or less successful when the environmental conditions changed?Did they aid the species to adjust to new conditions?How successful were they in the original environment to which the species had adapted?

The Vision Of Predators

Changes in habitat and in the variability of a population are not the only factors that can influence selection in the practice of this invention. Demonstrations can be made with changes in the predators. Provide one group of predators with colored cellophane masks, the other with clear masks. The former will experience great restriction in color vision and will see the world presumably as do certain animals, in varying shades of a single tone. Monochromatic, or greatly limited color vision, may be quite common among mammals. It is thought to occur in such well known predators as the canids (wolves, foxes, and dogs), and felids (lions, tigers, and cats). The subject however, has not been studied sufficiently to provide definite answers. Carry out the demonstration by conducting two experiments simultaneously, using identical starting populations on separate but identical backgrounds and two sets of predators differing in vision. Red has been found to be an effective mask color. At the end of the second or third generations, compare survivors.

Population Density, Reproductive Rates, and Warning Coloration

Additional uses of the natural selection demonstrations may come to mind. One might experiment with population density and its effect on the rate of selection. Determine how long it takes to reach the second generation using identical populations on backgrounds differing only in size—one twice as large as the other, for example. Be sure lighting is uniform and try to insure uniform predation. Conduct two programs simultaneously. Then switch the predators and repeat to check on the results. What are the implications with respect to the spacing of animals in nature? Other possibilities are to assign different reproductive rates to different chips or restrict the capture of chips of a certain type. Red chips, for example, might be placed off limits to attack because they are distasteful or protected by a game law. Note their rapid expansion in the population.

Demonstrating Natural Selection In Simulated Sexually-Reproducing Populations In contrast to the asexual demonstrations, when demonstrating natural selection in sexual reproducing populations the chips employed carry "genetic traits" and are "mated" prior to the production of offspring. Mated pairs thus produce offspring, limited in number to maintain a constant population size, in accord with established genetic principles; and the determination of offspring from among the genetic possibilities deriving from a given cross is achieved by chance, as by the rolling of special dice or by using any other known chance indicators.

Monohybrid Cross

A simple version of this type of demonstration will now be described. This version simulates a monohybrid cross. Two genetic factors or genes are involved—a trait for brown (B) and a trait for yellow (y), with brown dominant, hence the capital B. Individuals of three genotypes and two phenotypes occur in this cross:

| Genotypes | Phenotypes (external appearance of chips) |
|---|---|
| BB | Brown |
| By | Brown |
| yy | yellow |

BB and yy are individuals with like genes for each trait and are *homozygous* and By represents the hybrid individuals which are *heterozygous*. The three kinds of individuals may be represented by three kinds of colored chips—one brown (BB), one yellow (yy), and one brown with a yellow center (By). The latter is made by sandwiching a yellow chip between two brown ones, as shown in FIG. 3 of the drawings. So that the homozygotes (BB) and (yy) will be the same thickness as the heterozygotes (By) chips, they are also made three layers thick. The layered chips are made by fastening three layers of colored sheet paper or sheet plastic together and then forming the chips from the combined layers.

The kinds of genotypes and phenotypes and their proportions to be expected from this monohybrid cross are as follows:

| PARENTS Phenotype | I Brown Brown | II Brown Brown | III Brown Brown | IV Brown Yellow | V Yellow Yellow |
|---|---|---|---|---|---|
| Genotypes | BB × BB | BB × By | By × By | By × yy | yy × yy |
| Germ cells (Gametes) | B  B | B B B y | B y B y | B y y y | y  y |
| OFFSPRING Genotypes | BB | BB BB By By | BB By By yy | By yy By yy | yy |
| Ratio of Genotypes | All same | 1 : 1 | 1 : 2 : 1 | 1 : 1 | All same |
| Phenotypes | All brown | All brown | 75% brown 25% yellow | 50% brown 50% yellow | All yellow |

Genotypes And Phenotypes Of Monohybrid Cross

By way of example, a demonstration may be conducted by starting with 100 animals—25 homozygous brown (BB), 50 heterozygous brown (By—brown chips with yellow filler), and 25 homozygous yellow (yy). Distribute these over the fabric background and thereupon the predators remove half the chips. Survivors are randomly paired; consider arbitrarily one individual as male and the other as female. The 25 resulting pairs then produce two offspring each so as to restore the population to its former size, including the pairs of parents. The genotypes of the two offspring are readily determined in BB × BB and yy × yy combinations. Offspring from such crosses resemble their parents, both in genotype and phenotype. In BB × By and By × yy combinations, coins or other chance indicators must be used to determine which of the two possible offspring in each case are actually produced by the mated pair. Heads may represent homozygous and tails heterozygous individuals. In By × By combinations, which give a 1:2:1 ratio of genotypes—BB, By, By, yy—two coins or other chance devices must be used to determine the two offspring. Two heads may represent BB, two tails yy, and heads and tails By. Flipping the two coins once would give results representing the genotype of a single offspring.

When the offspring have been determined, they and their parents are returned to the habitat and the entire procedure is repeated.

If desired, the monohybrid cross can be conducted simulating incomplete dominance. The two different homozygotes, brown and yellow, for example, might produce hybrids that are intermediate in color—that is to say tan. Such a simulation does not require the use of three-layered chips.

Dihybrid Cross

Dihybrid crosses can be simulated by adding another set of factors to the population's "gene pool." To simplify the explanation of the mechanics of the cross, shape may be chosen as the additional characteristic. In this case, the chips, in addition to possessing genes for the colors brown and yellow, possess genes for shape: such as round and semiround. It may be stipulated that these new genes are on an additional pair of homologous chromosomes, so assortment and recombination of characteristics is of an independent nature. In this example, we also stipulate that the "semicircular character" masks the presence of any gene for round; that is, round chips can only occur if they possess two genes for "round." Two possible genes exist for color, as in the example used to illustrate a monohybrid cross. Consider the possible combinations resulting from a cross between two parents, heterozygous for both color and shape. The phenotype of the parents would be brown and semiround.

Possible combinations of genes for color and shape in a dihybrid cross with phenotypes indicated are illustrated below:

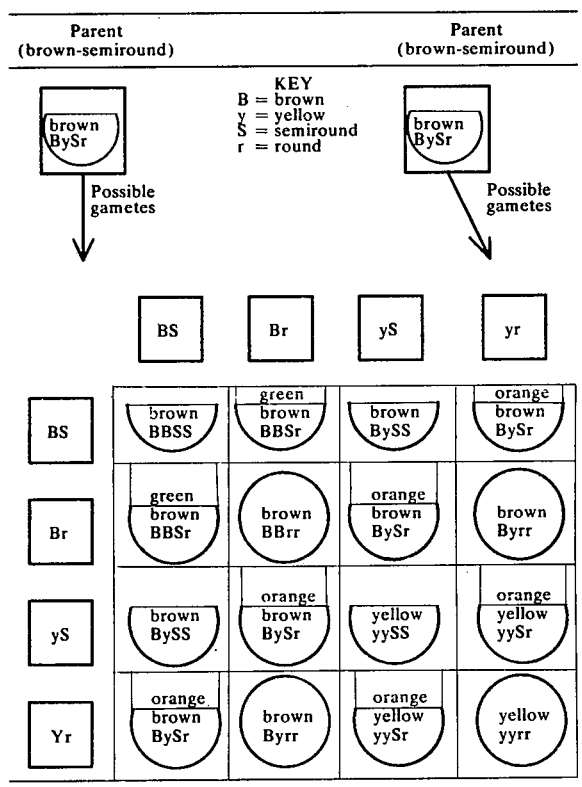

Bars above chips indicate color of special inner layer.

It can be seen that there are only four different phenotypes and they occur in the following proportions: 9 brown-semis, 3 brown-rounds, 3 yellow-semis, and 1 yellow round.

The proportions of the genotypes would be as follows: 4 BySr, 2 BBSR, 2 Byrr, 2 BySS, 2 yySr, 1 BBSS, 1 BBrr, 1yySS, and 1 yyrr. Of course, a cross in which both chips are homozygous for either shape or color, or both, will be incapable of producing all these possibilities in the immediately succeeding generation.

The genotypes of the chips are coded according to the next chart. The color of all layers is exactly as it would be in monohybrid crosses for brown and yellow traits alone, with the exception that chips which are heterozygous for the shape character are given specially colored inner layers as indicated (see colors framed with heavy line).

Color codes for color and shape genotypes are as follows:

| Genotype | Color of Outer Layers | Color of Inner Layer | Shape of Chip |
|---|---|---|---|
| BBSS | Brown | Brown | Semi |
| BBSr | Brown | Green | Semi |
| BBrr | Brown | Brown | Round |
| BySS | Brown | Yellow | Semi |
| BySr | Brown | Orange | Semi |
| Byrr | Brown | Yellow | Round |
| yySS | Yellow | Yellow | Semi |
| yySr | Yellow | Orange | Semi |
| yyrr | Yellow | Yellow | Round |

Using Dice To Determine The Offspring Of A Dihybrid Cross

As in rolling dice for a monohybrid cross, six-sided dice may be used, each die bearing symbols, representing two different genes which determine a given trait; for example, color. In a dihybrid cross, there are two pairs of dice; for instance, a green pair representing the genotype of one parent (female) and the red pair representing the genotype of the other (male).

Consider a dihybrid cross between two chips which are heterozygous for color and shape: one green die has three faces labeled B and three faces labeled y; the other green die has three faces labeled S and three labeled r. A roll of these two green dice will determine which of the alleles is chosen for inclusion in the female gamete. A roll of the identically labeled red dice indicates the constitution of the male gamete, and all four dice read together give the genotype of a single offspring. Both pairs of dice may be rolled together for convenience. It should be mentioned here that designation of either parental chip as male or female for dice rolling purposes is arbitrary.

A dihybrid cross between a pair of chips in which either chip is homozygous for shape or color restricts the possible combinations of genes in the offspring. The ratio of the probabilities of genotypes occurring, changes. If both parents are homozygous for a given character, some combinations possible with heterozygous parents cannot occur at all. These restrictions may be represented by placing the letter or letters representing the traits present in homozygous configurations, in the uppermost position and rolling the remaining dice. For example, in a cross between BBSS ( ) and BySr ( ), the red dice would be oriented so that the B and S faces are uppermost since BBSS is only capable of producing BS gametes. The green dice would be rolled as usual since BySr is capable of producing four different types of gametes. The most extreme restriction still necessitating any dice roll would be a cross such as *yySr* x *yyrr*. In such a cross, one pair of dice would be set with *y* and *r* uppermost and one die of the other pair would be set with *y* uppermost. Only a single die representing a choice between S or *r* would actually be rolled. Obviously, a cross between *yyrr* and *yyrr* or BBSS and BBSS would require no dice rolling at all since such crosses are only capable of producing yyrr or BBSS offspring, respectively.

Specially constructed dice can be used to speed the determination of offspring genotypes. Since the reproduction of individuals surviving the selection phase consumes a considerable amount of time, these dice are considered to be an important alternative to the cubical dice, although they are not as literal a representation of meiotic events. However, both systems are contemplated for this invention since their use gives additional flexibility in making the numerous different demonstrations encompassed within the objects of this invention.

Figure 4:
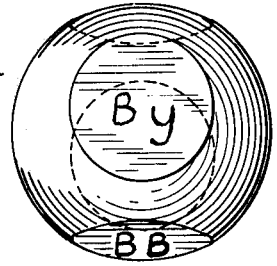
FIG. 4 is an elevational view of one of two or more dice to be used in conducting the demonstration of this invention, and having thereon certain genetic indicia which serve as a chance indication of the genetic characteristics of the progeny when making reproductions according to this invention.

The special dice for use when demonstrating dihybrid crosses may consist of spheroid plastic balls with four circular faces parallel and opposite to each other as illustrated in FIG. 4. As shown in FIG. 4 of the drawings, the hidden face opposite the face showing By is also labeled By, whereas the hidden face opposite the face showing BB is labeled yy. Two of these dice are used for a dihybrid cross between chips heterozygous for color and shape. One die (red) has faces labeled *BS*, *Br*, *yS*, and *yr*. A single roll of this die would determine the genetic content of the male gamete. An identically labeled green die is next rolled to determine the genetic content of the female gamete. One pair of these dice rolled together will give the genotype of a single offspring. If two pairs of spheroid dice are rolled at once, one can determine the genotypes of two offspring at once and this speeds the process of reproduction considerably.

Potential Modifications Of Sexual Reproduction Simulations

The extreme flexibility of the sexual version of this invention will be apparent as the basic system of laminated chips of different colors, sizes, and shapes provides a vehicle which can carry a tremendous variety of experiments and demonstrations. In the preceding description, only the simplest examples have been described in order to present the principles underlying the invention as clearly and concisely as possible. The explanation has been devoted to the mechanics of the simulations and their pedagogical applications have not been set forth.

However, a partial list of expansions and modifications of the sexual version will now be given.

Modifications And Expansions

1. Multiple alleles. One can create populations with many different genes for shape and color. For example, one can add several genes for color or shape and specify an order of dominance among them.

2. Co-dominant genes. One can define some genes as co-dominant. For example, one could say that chips heterozygous for brown and yellow genes have tan phenotypes or that chips heterozygous for semicircular and round genes have diamond-shaped phenotypes.

3. Dihybrid Crosses Using Other Characters. One can specify dihybrid crosses in which one uses color as the second set of characters instead of shape. The probabilities and combinations are similar to those as indicated on page 22, except that interactions have been specified between the two sets of genes in the form of pigment mixing so as to produce a greater number of phenotypes. One could use spots or stripes as the second set of characteristics in a dihybrid cross.

Figure 5:
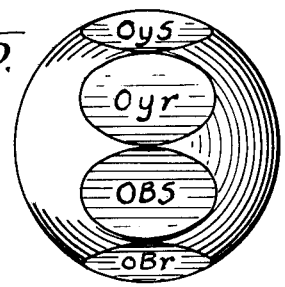
FIG. 5 is an elevational view of another form of die that can be used when conducting the demonstrations of this invention.
Figure 6:
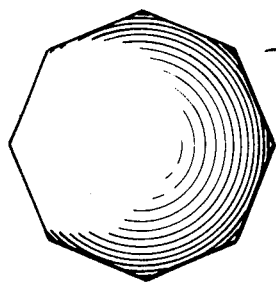
FIG. 6 is an elevational view of the die shown in FIG. 5, taken at right angles to the view shown in FIG. 5.

4. Trihybrid Crosses. It is possible to specify three sets of characters capable of independent assortment and segregation. For example, one could assign chips, spots, or stripes in addition to shape and color. This would give sixty-four possible combinations. Special octagonal dice, such as shown in FIG. 5 of the drawings, can be used to give the correct number of combinations in the proper ratios. However, the addition of another pair of cubical dice, one red and one green, to the set already explained for dihybrid crosses is another way of determining dihybrid genotypes. The additional dice each have three sides for one gene and three sides for its allele.

As shown in FIG. 5, the sides of each die are labeled with the eight possible combinations resulting from three characters each with two possible alleles. Color and shape characteristics each have two possible alleles as in the dihybrid cross; example, brown or yellow color, and semiround or round shape. A new characteristic can be added with two alleles: striped or unstriped, symbolized by $\phi$ and 0, respectively. One can use two identically labeled dice for a trihybrid cross. A roll of one die determines the genetic constitution of one gamete. Two dice determine the genotype of an offspring. The eight sides may be labeled as follows:

| | |
|---|---|
| OBS | $\phi$BS |
| OBr | $\phi$Br |
| OyS | $\phi$yS |
| Oyr | $\phi$yr |

Prior to this invention, demonstrations were carried out to show the protective effect provided by a particular background for objects of different color, which consisted of distributing over a predetermined area of green grass a multiplicity of uncolored toothpicks and an equal number of green toothpicks. The persons participating in that demonstration could observe that the uncolored toothpicks were more readily observed and retrieved. In accordance with this invention, however, background panels of predetermined color and design are provided for numerous different and comparative tests, and in which multiple exposures to predators are carried out together with alternating reproduction programs of predetermined character in order to show particular results of simulated natural selection and evolution as conducted under different circumstances. Accordingly, the demonstrations of this invention are novel and are distinguishable over the prior practice referred to.

We claim:

1. A method of demonstrating the results of the organic evolutionary process known as natural selection comprising the following steps:
   a. providing a background panel of predetermined color and design for simulating a life-sustaining environment;
   b. providing a plurality of chips of different colors, each of said colors simulating a different species of life existing in said environment;
   c. selecting a predetermined number of chips from said plurality thereof;

d. distributing said predetermined number of said chips onto the surface of said background panel so that, because of their color, some of said chips blend more readily into said background panel than other ones of said chips;

e. removing individual chips as they are readily detected by visual recognition due to their failure to readily blend into said background panel until a predetermined percentage of said predetermined number of chips has been removed; and f. thereafter redistributing onto the surface of said background panel a predetermined additional number of said chips having a color corresponding to the color of said chips remaining on said panel; said additional number of said chips simulating the offspring of said species simulated by said chips remaining on said panel, and being selected as to appearance characteristics by chance determinations.

2. The method of claim 1 further characterized in that the selections made in performance of the population restoration step are conducted on the basis of a monohybrid cross.

3. The method of claim 1 further characterized in that the selections made in performance of the population restoration step are conducted on the basis of a dihybrid cross.

4. The method of claim 1 further characterized in that the selections made in performance of the population restoration step are conducted on the basis of a trihybrid cross.

5. The method of claim 1 further characterized in that the selections made in performance of the population restoration step are conducted on the basis of a multihybrid cross.

* * * * *

UNITED STATES PATENT AND TRADEMARK OFFICE
CERTIFICATE OF CORRECTION

PATENT NO. : 4,030,210

DATED : June 21, 1977

INVENTOR(S) : Robert C. Stebbins; Allen S. Brockenbrough and Charles W. Brown

It is certified that error appears in the above—identified patent and that said Letters Patent are hereby corrected as shown below:

Col. 7, line 61 "selctive" should be "selective".

Col. 12, line 62 "()" should be "(♂)".

Col. 12, line 63 "()" should be "(♀)".

Signed and Sealed this

Thirteenth Day of June 1978

[SEAL]

Attest:

RUTH C. MASON
*Attesting Officer*

DONALD W. BANNER
*Commissioner of Patents and Trademarks*